US009411795B2

(12) United States Patent
Teixeira Dos Santos et al.

(10) Patent No.: US 9,411,795 B2
(45) Date of Patent: Aug. 9, 2016

(54) CONTENT PLACEMENT

(75) Inventors: Jair F. Teixeira Dos Santos, Porto Alegre (BR); Lonnie D. Mandigo, Corvallis, OR (US); HonHung Tang, Corvallis, OR (US); Felipe Roos Da Rosa, Porto Alegre (BR); Jon A. Brewster, Monmouth, OR (US); Fernanda Dias, Porto Alegre (BR); Roberto Domingues Reznicek, Porto Alegre (BR); Ricardo Alexandre de Oliveira Staudt, Porto Alegre (BR); Paulo Ricardo Tatsch Dutra, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 12/880,898

(22) Filed: Sep. 13, 2010

(65) Prior Publication Data

US 2012/0066589 A1    Mar. 15, 2012

(51) Int. Cl.
| | |
|---|---|
| *G06F 17/00* | (2006.01) |
| *G06F 17/24* | (2006.01) |
| *G06F 17/21* | (2006.01) |
| *G06F 3/12* | (2006.01) |
| *G06Q 30/02* | (2012.01) |
| *G06Q 10/10* | (2012.01) |

(52) U.S. Cl.
CPC .............. *G06F 17/24* (2013.01); *G06F 3/1208* (2013.01); *G06F 3/1243* (2013.01); *G06F 3/1285* (2013.01); *G06F 17/211* (2013.01); *G06F 17/212* (2013.01); *G06F 17/243* (2013.01); *G06F 17/248* (2013.01); *G06Q 30/0241* (2013.01); *G06F 3/1245* (2013.01); *G06F 2206/1512* (2013.01); *G06Q 10/10* (2013.01)

(58) Field of Classification Search
CPC ... G06F 17/248; G06F 3/1243; G06F 17/243; G06F 17/211; G06F 17/212; G06F 17/24; G06F 2206/1512; G06F 3/1208; G06F 3/1245; G06F 3/1285
USPC .................. 715/249, 235, 248, 243, 236, 274
See application file for complete search history.

(56) References Cited

U.S. PATENT DOCUMENTS

| | | | |
|---|---|---|---|
| 6,584,480 B1 | 6/2003 | Ferrel et al. | |
| 6,685,368 B1 * | 2/2004 | Beckman | ........................ 400/70 |
| 2004/0205469 A1 * | 10/2004 | Mellor | .......................... 715/500 |
| 2004/0205609 A1 * | 10/2004 | Milton et al. | .................. 715/522 |
| 2005/0063010 A1 * | 3/2005 | Giannetti | ..................... 358/1.18 |
| 2005/0120290 A1 * | 6/2005 | Mistry et al. | ................... 715/500 |
| 2005/0132283 A1 * | 6/2005 | Diwan et al. | ................... 715/517 |
| 2005/0160362 A1 * | 7/2005 | Obradovic et al. | ........... 715/527 |
| 2006/0156232 A1 | 7/2006 | Giannetti et al. | |
| 2006/0201364 A1 * | 9/2006 | Simske et al. | ................. 101/483 |

(Continued)

OTHER PUBLICATIONS

Duhl, Joshua, "What is Dynamic Publishing?" The Dynamic Publisher Your Source for Dynamic Publishing News, Research Paper, Issue 1, Sep. 2008, 3 pages, http://www.thedynamicpublisher.com/archives/09_08/what_is_dynamic_publishing.html.

*Primary Examiner* — Nathan Hillery

(74) *Attorney, Agent, or Firm* — HP Inc. Patent Department

(57) ABSTRACT

A content placement method includes electronically identifying a placeholder image in an electronic document. The placeholder defines a copy hole. The placeholder image is decoded to discern content selection data. The content selection data is processed to identify content that is inserted into the copy hole.

10 Claims, 6 Drawing Sheets

(56) References Cited

U.S. PATENT DOCUMENTS

| | | | |
|---|---|---|---|
| 2006/0235874 A1* | 10/2006 | Lumley et al. | 707/103 R |
| 2006/0262995 A1* | 11/2006 | Barrus et al. | 382/317 |
| 2006/0294450 A1* | 12/2006 | Barrus et al. | 715/500 |
| 2008/0155394 A1* | 6/2008 | Sellman et al. | 715/235 |
| 2009/0024917 A1* | 1/2009 | Giannetti | 715/249 |
| 2009/0037254 A1 | 2/2009 | Colando | |
| 2009/0128860 A1* | 5/2009 | Graushar et al. | 358/3.28 |
| 2009/0153905 A1* | 6/2009 | Cyman et al. | 358/1.18 |
| 2009/0249195 A1 | 10/2009 | Angell | |
| 2010/0287568 A1* | 11/2010 | Sundararaman et al. | 719/318 |
| 2010/0328725 A1* | 12/2010 | Gaucas et al. | 358/1.18 |
| 2011/0149005 A1* | 6/2011 | Wolanski et al. | 347/107 |

* cited by examiner

CONTENT PLACEMENT

BACKGROUND

Costs incurred for producing and circulating publications are often offset by revenue generated by including advertisements within the publication. Advertisements are more successful when properly targeted. Web page advertising has progressed such that advertisements can be targeted to particular viewers. This is not the case for printed publications such as newspapers where all readers of a publication run are presented with the same advertisements. Publishers do not have the tools to dynamically insert different advertising content into different copies of a given publication.

DRAWINGS

DETAILED DESCRIPTION

Introduction

The move from analog to digital printing provides an opportunity for publishers to include highly targeted advertisements. The particular advertisements to be included in a copy can be determined just before the copy is published. The advertisement selection can be based on many factors including the subject matter of the publication, the geographic location associated with a recipient, as well as other recipient characteristics. In this manner, different copies of the same publication can have different advertisements.

Various embodiments described below utilize a placeholder image inserted into a document master to define copy holes for inserting content such as advertisements. Each placeholder image encodes content selection data that can be processed to select the content to insert into the copy hole defined by the placeholder. The document master can be processed for each recipient to insert content individualized for that recipient.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
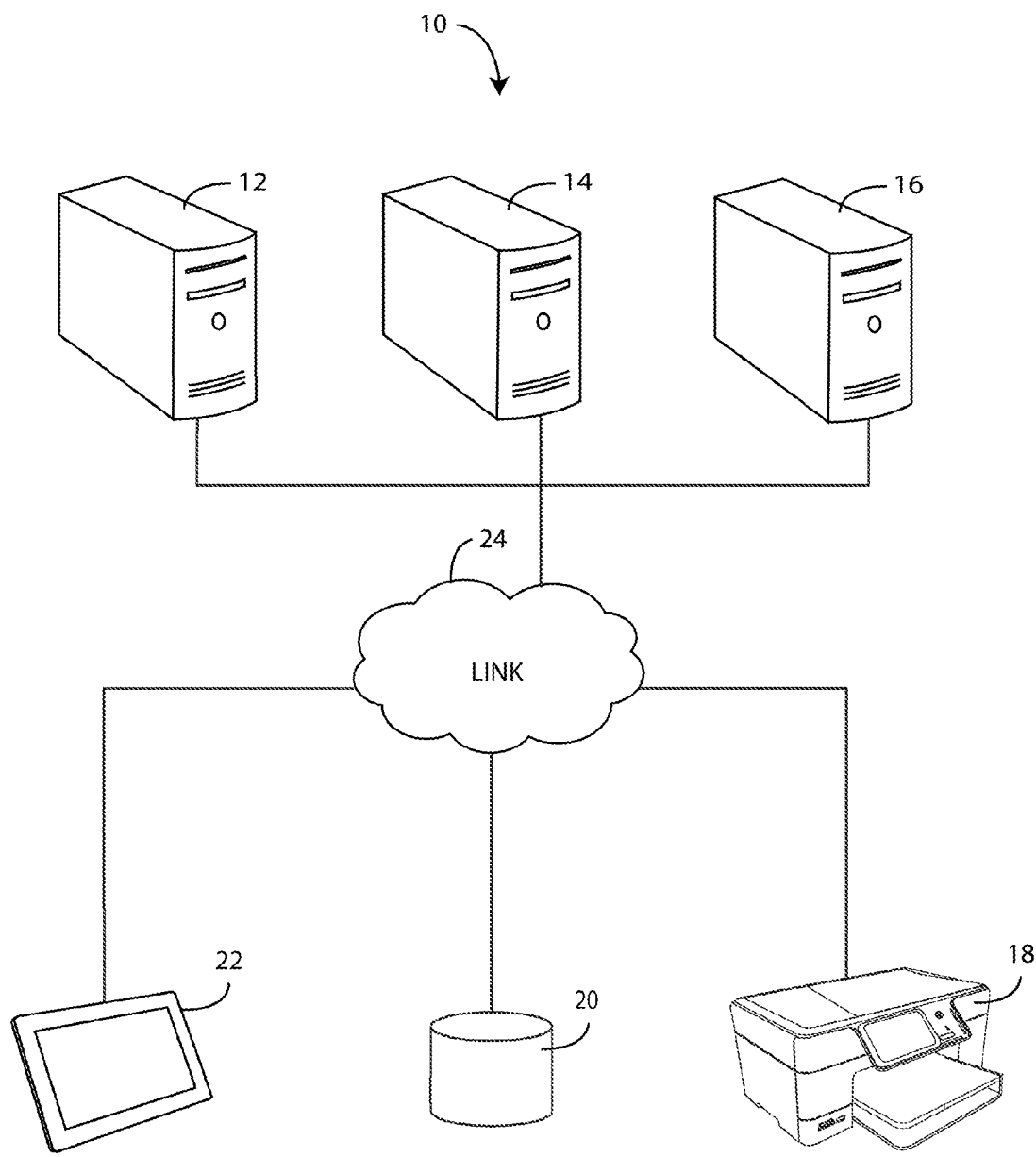
FIG. 1 depicts an environment in which various embodiments may be implemented.

Environment:

FIG. 1 depicts an exemplary environment 10 in which various embodiments may be implemented. Environment 10 is shown to include editor 12, publishing service 14, content broker 16, printer 18, data storage device 20, and display 22. Editor 12 represents generally any computing device or combination of computing devices configured to define and insert placeholder images into documents. As used herein, a placeholder image is an image that defines a copy hole and encodes content selection data. Encoding may be accomplished, for example, by the inclusion of a barcode that represents the content selection data. Encoding may also be accomplished by including the content selection data as metadata of the placeholder image.

Publishing service 14 represents generally any computing device or combination of computing devices configured to electronically process a master document to identify placeholder images and decode those images to discern the content selection data. Publishing service then uses the content selection data to acquire content from content broker 16 for insertion into the copy holes defined by the placeholder images. Once each copy hole is populated, publishing service 14 publishes the document. Note that the copy holes may be populated with different content for different recipients of the published document. Content broker 16 represents generally any computing device or combination of computing devices configured to provide content to publishing service 14 for insertion into copy holes.

Printer 18 represents generally any device capable of being utilized by publishing service 14 to publish by printing a document. Storage device 20 represents generally any device capable of being used by publishing service 14 to publish by archiving a document. Display 22 represents generally any device capable of being used to display a document published by publishing service 14.

Components 12-22 are interconnected via link 24. Link 24 represents generally one or more of a cable, wireless, fiber optic, or remote connections via a telecommunication link, an infrared link, a radio frequency link, or any other connectors or systems that provide electronic communication. Link 24 may include, at least in part, an intranet, the Internet, or a combination of both. Link 24 may also include intermediate proxies, routers, switches, load balancers, and the like. The paths followed by link 24 between components 12-22 as depicted in FIG. 1 represent the logical communication paths between these devices, not necessarily the physical paths between the devices.

Figure 2:
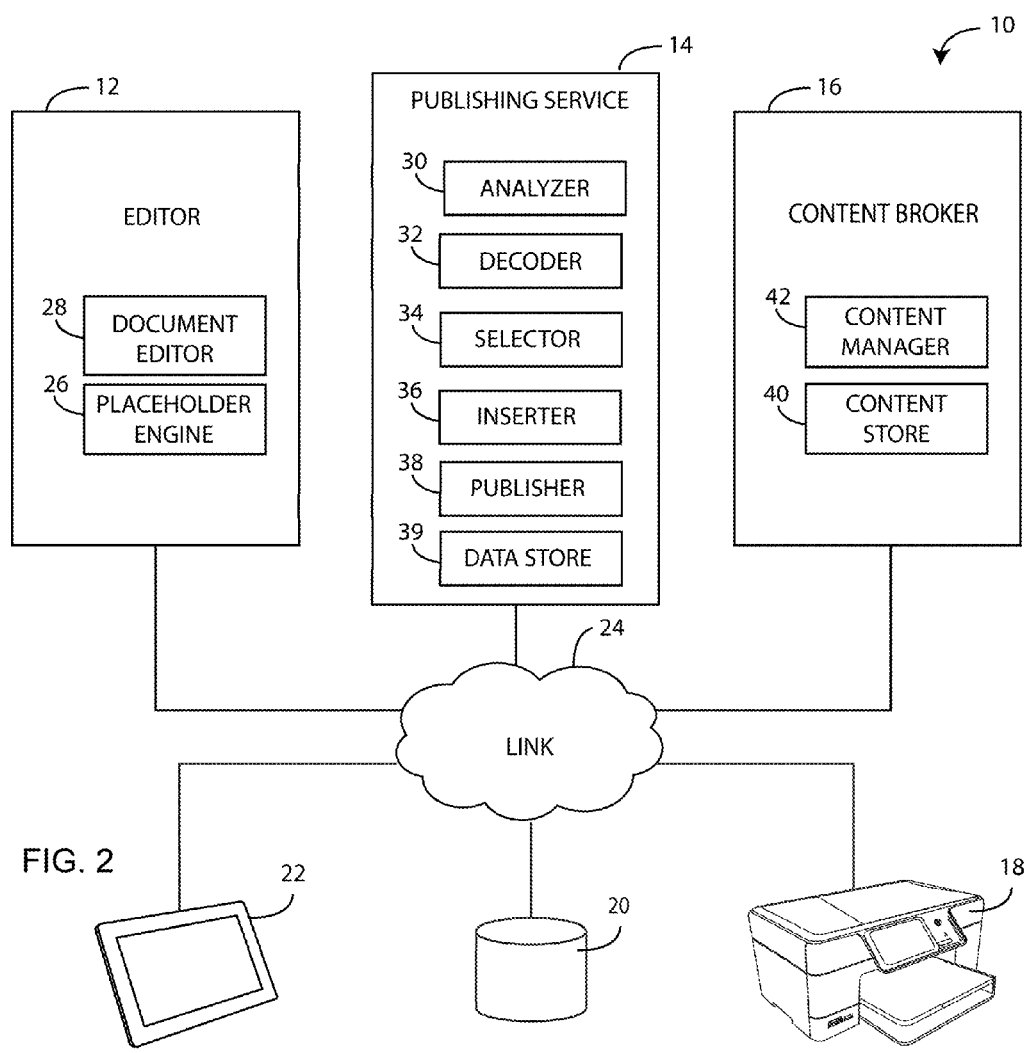
FIG. 2 depicts various physical and logical components for implementing various embodiments.

Components:

FIG. 2 depicts various physical and logical components for implementing various exemplary embodiments. In FIG. 2, editor 12 includes placeholder engine 26 and document editor 28. Placeholder engine 26 represents generally any combination of hardware and programming configured to generate placeholder images. Document editor 28 represents generally any combination of hardware and programming configured for being used to generate a master document. A master document is an electronic file defining each page of a document to be published. Document editor 28 is also configured to be used to insert placeholder images generated by placeholder engine 26 into a master document.

Once inserted, a placeholder image defines a copy hole for inserting content. For example, a placeholder image may have dimensions corresponding to the dimensions of the copy hole. Thus, once placed in the document, the position and size of the copy hole can be discerned from the position and dimensions of the placeholder image. As noted, placeholder images encode content selection data. Content selection data is data that can be used to identify content for insertion into the copy hole defined by the placeholder image. Content selection data may, for example, include data identifying a set from which content can be selected to fill the copy hole, characteristics of an intended reader, and characteristics of the document. A set may include a set of advertisements relevant to a particular geographic location or a set of advertisements deemed relevant to a particular demographic. Characteristics of an intended reader can include information related to age, income, gender, employment, known hobbies, and the like. Characteristics of the document can, for example, include data identifying the topic of an article or data identifying a theme of the document. As discussed below, it is noted that some content selection data such as document characteristics may be encoded by a placeholder image while other content selection data such as reader or recipient characteristics may be available from a separate source.

Publishing service 14 is shown to include analyzer 30, decoder 32, selector 34, inserter 36, publisher 38, and data store 39. Analyzer 30 represents generally any combination of hardware and programming configured to analyze a master document provided by editor 12 to identify placeholder images. As noted above a placeholder image may include a barcode that encodes content selection data. It may also or instead include metadata. Analyzer 30 may then perform its function by examining the master document for images having barcodes or metadata indicating that the image is a placeholder image.

Decoder 32 represents generally any combination of hardware and programming configured to decode placeholder images to discern content selection data. Again, using the examples from above, a placeholder image may include a barcode. Decoder 32 would then be responsible for identifying the content selection data encoded by the barcode. A placeholder image may include the content selection data as metadata. Decoder 32 would then be responsible for reading the metadata to discern the content selection data. Decoder 32 may also obtain content selection data from another source such as a data store 39 maintained by or otherwise accessible to publishing service 14. Data store 39 may contain one type of content selection data while the placeholder image may include another type. For example, decoder 32 may obtain characteristics of the intended reader from data store 39 and characteristics of the document from a decoded placeholder image.

Selector 34 represents generally any combination of hardware and programming configured to utilize content selection data to acquire content for insertion into a copy hole defined by a placeholder image. n performing its task, selector 34 may communicate the obtained content selection data to content broker 16 and ultimately acquire the content as a result of that communication. Inserter 36 represents generally any combination of hardware and programming configured to insert content acquired by selector 34 into corresponding copy holes. Publisher 38 represents generally any combination of hardware and programming configured to publish a document once its copy holes have been filled with content. Publishing, in this example, can include causing printer 18 to print, archiving on storage device 20, or causing a display on display device 22.

Content broker 16 is shown to include content store 40 and content manager 42. Content store 40 represents a collection of content, typically images, that can be inserted into copy holes defined by placeholder images. Such content, for example, can include advertisements related to a variety of products and services available in specified geographic locations. Content manager 42 represents generally any combination of hardware and programming configured to return content selected from content store based upon content selection data received from publishing service 14. For example, content selection data may identify a geographic location so that content manager 42 returns content relevant to that location. The content selection data may also identify characteristics of a recipient causing content manager 42 to further filter and return content relevant to the recipient and the geographic location. The content selection data may also identify characteristics of the document causing content manager 42 to further filter and return content relevant to the document, to the recipient, and the geographic location.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 3:
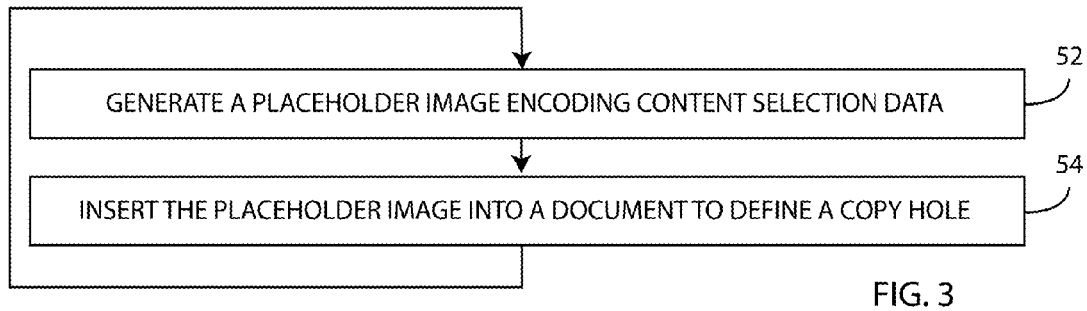
FIGS. 3-6 are flow diagrams depicting steps taken to implement various embodiments.
Figure 4:
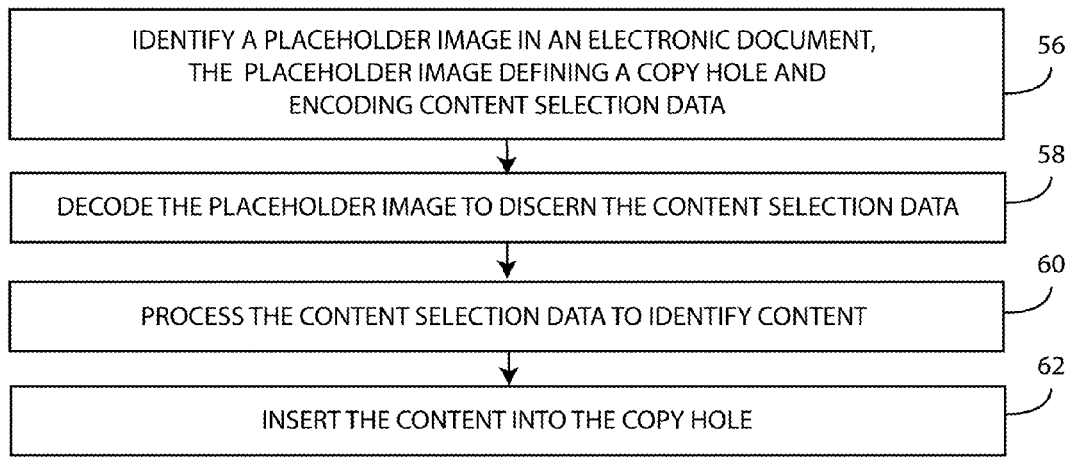
Figure 5:
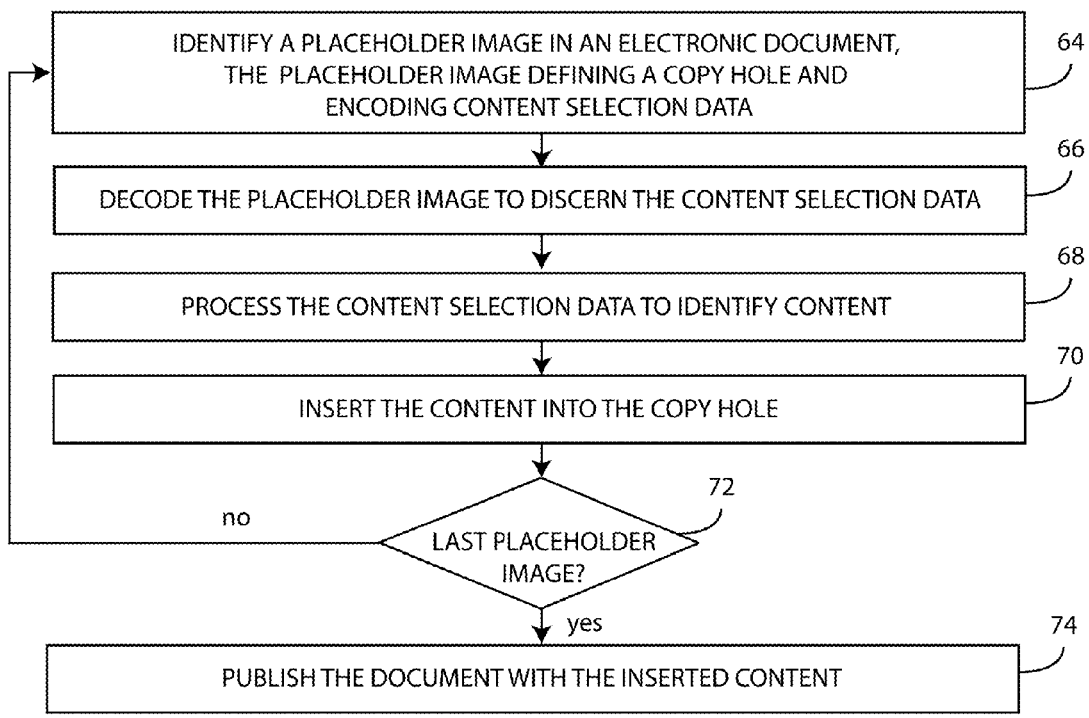
Figure 6:
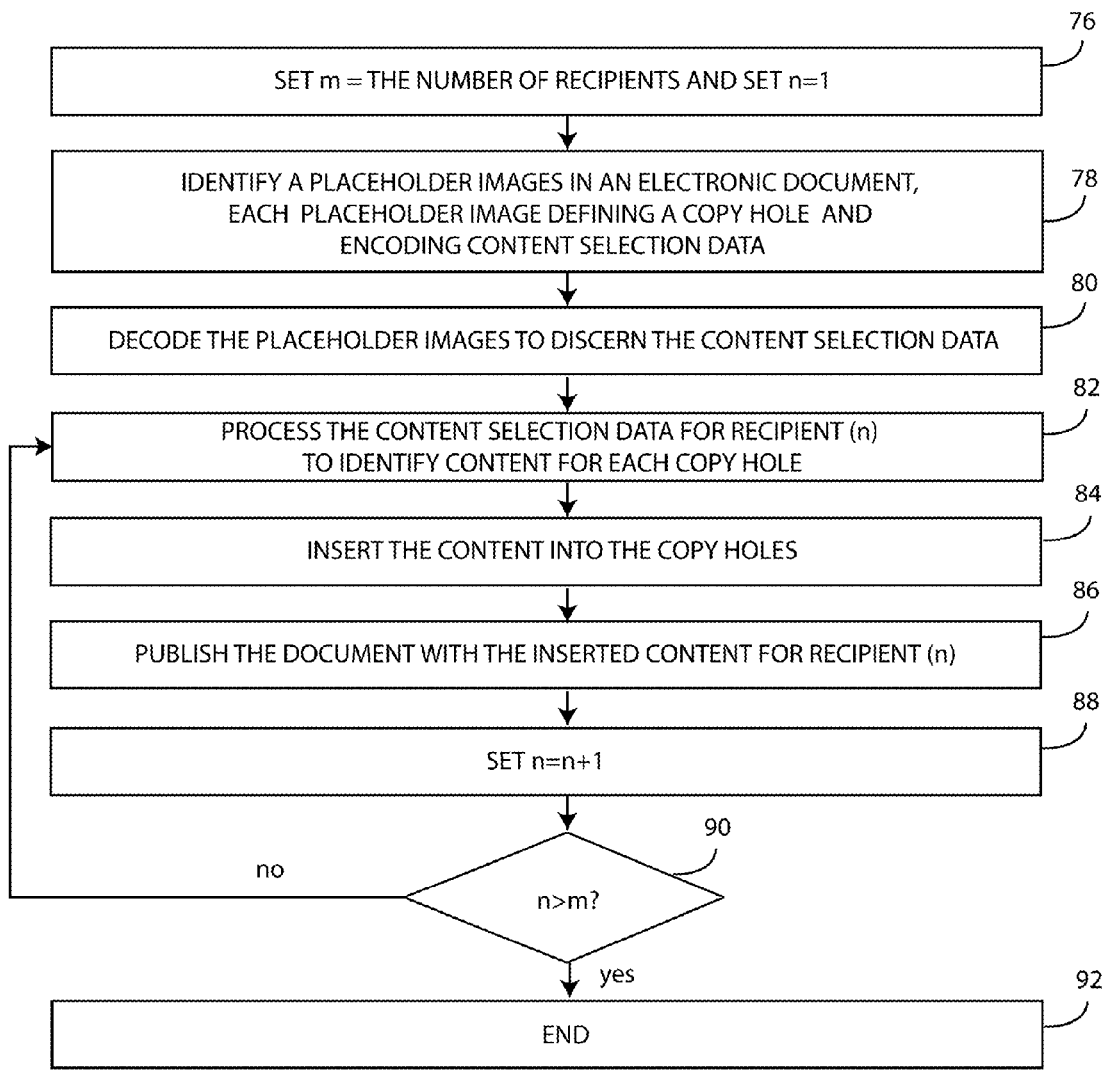

Operation:

FIGS. 3-6 are exemplary flow diagrams of steps taken to implement various embodiments. In discussing FIGS. 3-6, reference may be made to component of FIGS. 1-2 to provide contextual examples. Implementation, however, is not limited to those examples. The steps in FIG. 3 are taken from the perspective of editor 12, while the steps in FIGS. 4-6 are taken from the perspective of publishing service 14.

Starting with FIG. 3, a placeholder image is generated (step 52). The placeholder image encodes content selection data. The content selection data is information that can be processed to identify content. That information may identify a set from which content may be selected. It may identify characteristics of a publication recipient such as a geographic location, age, gender, income, and the like. It can also identify characteristics of the document such as a topic of an article or a general theme such as sports or current events. The placeholder image is inserted into a document defining a copy hole (step 54).

Referring to FIGS. 1 and 2, steps 52 and 54 may be performed by editor 12 and in particular by placeholder engine 26 with the aid of document editor 28. Step 52 can include generating an image having dimensions corresponding to the dimension of the content that is ultimately identified by processing the content selection data and used to fill the copy hole. That image may include a barcode that encodes the content selection data. The image may encode the content selection data by incorporating it as metadata. Thus, by inserting the placeholder image into the document in step 52, the dimensions of the image combined with the specific placement of the image on a document page define the copy hole. It is also noted that steps 52 and 54 can be repeated for each additional copy hole to be defined in the document. When completed, the document, sometimes referred to as a master, can be forwarded on to a publishing service such as publishing service 14.

Moving to FIG. 4, a placeholder image is identified within a document (step 56). The placeholder image encodes content selection data. The placeholder image is decoded to discern that content selection data (step 58). Referring to FIGS. 1 and 2, steps 56 and 58 may be performed by publishing service 14. In particular, step 56 may be implemented by analyzer 30 while step 58 may be implemented by decoder 32. Step 56 may be performed by examining the document to search for an image having a specified characteristic such as a barcode or metadata indicating that the image is a placeholder image. Where the placeholder image includes a barcode, step 58 can include decoding that barcode to discern the content selection data. Step 58 may involve decoding the placeholder image by reading out its metadata to discern the content selection data. Note that step 58 may also include obtaining additional content selection data from another source. For example, the placeholder image may be decoded to discern characteristics of the document being published. Additional content selection data identifying characteristics of an intended recipient of that document once published may be obtained from another source.

The content selection data is processed to identify content (step 60). The identified content is inserted into the copy hole (step 62). Referring to FIGS. 1 and 2, steps 60 and 62 may be implemented by publishing service 14 with the aid of content broker 14. In particular, step 60 may be implemented by selector 34 while step 62 may be implemented by inserter 36. Step 60 may involve selector 34 passing content selection data to content broker 16 which then returns content selected as relevant based on the content selection data.

FIG. 5 expands on FIG. 4 depicting steps for inserting content into multiple copy holes and ultimately publishing the document. A placeholder image is identified within a document (step 64). The placeholder image encodes content selection data. The placeholder image is decoded to discern that content selection data (step 66). Referring to FIGS. 1 and 2, steps 64 and 66 may be performed by publishing service 14. In particular, step 64 may be implemented by analyzer 30 while step 58 may be implemented by decoder 32. Step 66 may be performed by examining the document to search for an image having a specified characteristic such as a barcode or metadata indicating that the image is a placeholder image. Where the placeholder image includes a barcode, step 66 can include decoding that barcode to discern the content selection data. Step 66 may involve decoding the placeholder image by reading out its metadata to discern the content selection data. As with step 58, step 66 may also include obtaining additional content selection data from another source.

The content selection data is processed to identify content (step 68). The identified content is inserted into the copy hole (step 70). Referring to FIGS. 1 and 2, steps 68 and 70 may be implemented by publishing service 14 with the aid of content broker 14. In particular, step 68 may be implemented by selector 34 while step 70 may be implemented by inserter 36. Step 68 may involve selector 34 passing content selection data to content broker 16 which then returns content selected as relevant based on the content selection data.

It is next determined if the placeholder image identified in step 64 is the last placeholder image in the document (step 72). If not, the process repeats with step 64 and the next placeholder image is identified and the copy hole it defines is filled with content in steps 68 and 70. Upon a positive determination in step 72, the document is published with the inserted content (step 74). Referring to FIG. 2, publisher 38 may be responsible for implementing step 74. Step 74 may, for example, involve causing the document to be printed, displayed, or archived.

FIG. 6 expands on FIG. 4 depicting steps taken to publish copies of a document for multiple recipients. Initially, a variable (n) is to equal the number of recipients, and a variable (n) is set to equal one (step 76). Placeholder images are identified within a document (step 78). The placeholder images each encode content selection data. Each placeholder image is decoded to discern that content selection data (step 80). As with steps 58 and 66, step 80 may also include obtaining additional content selection data from another source. For example, the placeholder image may be decoded to discern characteristics of the document being published. Additional content selection data identifying characteristics of an intended recipient of that document once published may be obtained from another source. Referring to FIGS. 1 and 2, steps 78 and 80 may be performed by publishing service 14. In particular, step 78 may be implemented by analyzer 30 while step 80 may be implemented by decoder 32. Step 78 may be performed by examining the document to search for an image having a specified characteristic such as a barcode or metadata indicating that the image is a placeholder image. Where the placeholder image includes a barcode, step 80 can include decoding that barcode to discern at least some of content selection data with any remainder being obtained from another source. Step 80 may involve decoding the placeholder image by reading out its metadata to discern the content selection data.

For each placeholder image, its corresponding content selection data is processed to identify content for recipient (n) (step 82). The identified content is inserted into the copy hole defined by that image (step 84). Referring to FIGS. 1 and 2, steps 82 and 84 may be implemented by publishing service 14 with the aid of content broker 16. In particular, step 82 may be implemented by selector 34 while step 84 may be implemented by inserter 36. Step 82 may involve selector 34 passing content selection data to content broker 16 which then returns content selected as relevant based on the content selection data.

The document is published for recipient (n) with the inserted content (step 86). Referring to FIG. 2, publisher 38 may be responsible for implementing step 74. Step 86 may, for example, involve causing the document to be printed, displayed, or archived. The variable (n) is incremented (step 88) and a determination is made as to whether the variable (n) exceeds the variable (m) (step 90). If not the process repeats with step 82 where the content selection data is again processed for a subsequent recipient, corresponding content inserted, and a subsequent copy published. Upon a negative determination in step 90, the process ends (step 92).

Figure 7:
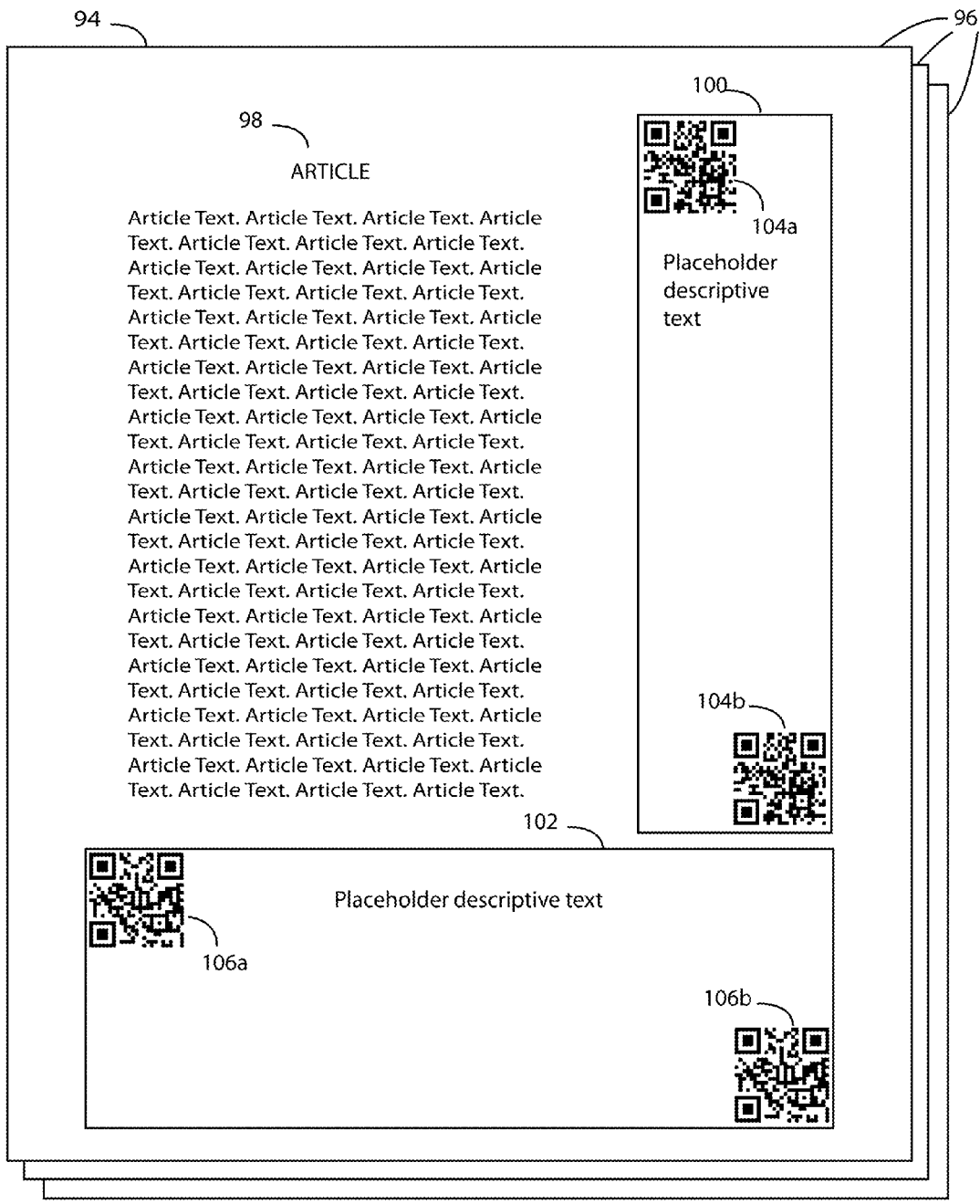
FIG. 7 depicts a document with placeholder images according to an embodiment.

FIG. 7 is a visual depiction of an electronic document 94 having a series of pages 96. Document 94 includes an article 98. Placeholder images 100 and 102 have been inserted on the top page. The position and dimensions of each placeholder image 100 and 102 define copy holes into which content is to be inserted. That content, for example, may be advertisements. Placeholder image 100 includes barcodes 104a and 104b positioned in opposing corners of image 100. Barcodes 104a and 104b are shown as identical but may differ. Barcodes 104a and 104b encode content selection data to be used to select content to insert into the copy hole defined by placeholder image 100. Likewise, placeholder image 102 includes barcodes 106a and 106b positioned in opposing corners of image 102. Barcodes 106a and 106b encode content selection data to be used to select content to insert into the copy hole defined by placeholder image 100.

It is noted that while barcodes 104 and 16 are shown as QR (Quick Response) codes, other types of barcodes may be used such as one dimensional barcodes and color matrices. Also, instead of including barcodes, placeholder images 100 and 102 may encode content selection data as metadata.

CONCLUSION

The diagrams of FIGS. 1-2 show the architecture, functionality, and operation of various embodiments. Various components illustrated in FIGS. 1-2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 3-6 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A content placement method comprising:
    determining, by a processor, a recipient of a plurality of recipients to receive an electronic document;
    identifying, by the processor, a placeholder image inserted into the electronic document, the placeholder image defining a copy hole of the electronic document and content relevant to the recipient, wherein the placeholder image has dimensions that correspond to dimensions of the copy hole and includes encoded content selection data, wherein the content selection data identifies a set of data from which content is selected to fill the copy hole, wherein the set of data corresponds to at least one of a geographic location and demographic information associated with the recipient, and wherein the placeholder image includes barcodes positioned in opposing corners of the placeholder image;
    decoding, by the processor, the encoded content selection data for the placeholder image, wherein decoding the encoded content selection data for the placeholder image comprises decoding the barcodes to discern the content selection data; and
    identifying content corresponding to the content selection data and corresponding to the recipient;
    inserting, by the processor, the identified content into the copy hole defined by the placeholder image; and
    publishing, by the processor, the electronic document including the identified content corresponding to the recipient.

2. The method of claim 1, wherein the content identified and inserted into the electronic document published for the recipient is different than the content identified and inserted into the electronic document published for another recipient.

3. The method of claim 1, wherein decoding the encoded content selection data for the placeholder image comprises acquiring the content selection data included as metadata in the placeholder image.

4. The method of claim 1, wherein a portion of the content selection data is obtained from a source other than the encoded content selection data.

5. A content placement system, comprising:
    a processor and a memory coupled to the processor to implement:
        a publishing service to determine a recipient of a plurality of recipients to receive an electronic document;
        an analyzer to identify a placeholder image in the electronic document, the placeholder image defining a copy hole of the electronic document and content relevant to the recipient, wherein the placeholder image has dimensions that correspond to dimensions of the copy hole and includes encoded content selection data, wherein the content selection data identifies a set of data from which content is selected to fill the copy hole, and wherein the set of data corresponds to at least one of a geographic location and demographic information associated with the recipient; and
        a decoder to decode the encoded content selection data of the placeholder image; and
    wherein the processor is to iteratively:
        identify content corresponding to the content selection data and corresponding to the recipient;
        insert the identified content into the copy hole defined by the placeholder image; and
        publish the electronic document including the identified content corresponding to the recipient,
        wherein the placeholder image includes barcodes positioned in opposing corners of the placeholder image, and wherein the decoder is to decode the barcodes to identify the content corresponding to the recipient.

6. The system of claim 5, wherein:
    the content inserted into the electronic document published for a first recipient is different than the content inserted into the electronic document published for a second recipient.

7. The system of claim 5, wherein the decoder is to decode the encoded content selection data of the placeholder image by acquiring a portion of the content selection data included as metadata in the placeholder image.

8. The system of claim 5, wherein the decoder is to decode the encoded content selection data of the placeholder image to discern a portion of the content selection data and to obtain a remainder of the content selection data from another source.

9. A non-transitory computer readable medium having instructions that when executed cause a processor to implement a content placement method comprising:
    determining a recipient of a plurality of recipients to receive an electronic document;
    generating a placeholder image, wherein generating the placeholder image includes:
        generating the placeholder image having dimensions matching dimensions of a copy hole of the electronic document to be filled with content selected by processing a rule;
        determining content selection data for selecting content for the electronic document, wherein the content selection data identifies a set of data from which content is selected to fill the copy hole, and wherein the set of data corresponds to at least one of a geographic location and demographic information for the recipient; and
        encoding the placeholder image with the content selection data; and
    inserting the placeholder image into the electronic document, wherein upon publication of the electronic document, the encoded content selection data of the placeholder image is to be decoded and the content selection data processed to identify and insert the selected content into the copy hole of the electronic document,
wherein generating the placeholder image comprises generating a placeholder image that includes barcodes positioned in opposing corners of the placeholder image, the barcodes to be decoded to discern the content selection data.

10. The non-transitory computer readable medium of claim 9, wherein generating a placeholder image comprises generating a placeholder image that includes the content selection data as metadata.

* * * * *